United States Patent [19]

Kiess et al.

[11] Patent Number: 4,557,886
[45] Date of Patent: Dec. 10, 1985

[54] METHOD OF PRODUCING CAPACITIVE ELECTRONIC DISCS

[75] Inventors: Helmut G. Kiess, Niedersteinmaur, Fed. Rep. of Germany; Bruno K. Binggeli, Arni; Max Derendinger, Zurich, both of Switzerland

[73] Assignee: RCA Corporation, Princeton, N.J.

[21] Appl. No.: 619,985

[22] Filed: Jun. 12, 1984

[51] Int. Cl.[4] ............................................. B29D 17/00
[52] U.S. Cl. .................................... 264/105; 264/107; 427/122
[58] Field of Search ....................... 264/104, 105, 107; 427/25, 122

[56] References Cited

U.S. PATENT DOCUMENTS 4,512,916  4/1985  Datta .................................... 252/511
4,515,830  5/1985  DiMarco ............................. 427/122

Primary Examiner—Donald Czaja
Assistant Examiner—V. Fischbach
Attorney, Agent, or Firm—Birgit E. Morris; R. Hain Swope

[57] ABSTRACT

Thin, flexible capacitive electronic discs are formed by directly compression molding a powder composition having a particle size such that no particles are larger than about 400 micrometers and a substantial portion is between about 25 and 300 micrometers and comprising a thermoplastic resin, conductive carbon black particles and suitable additives. An information track is embossed into at least one surface of the disc, preferably simultaneously with the molding step. The discs are from about 0.15 to 0.6 mm thick. Preferably, the discs are about 0.2 mm thick, which is about one-tenth of the thickness of present commercial discs.

10 Claims, No Drawings

METHOD OF PRODUCING CAPACITIVE ELECTRONIC DISCS

This invention relates to ultra thin, high density information discs and a method for making them.

BACKGROUND OF THE INVENTION

Clemens, in U.S. Pat. No. 3,842,194, discloses a capacitive video disc playback system which includes a high density information disc record having a conductive surface. Initially, information records for this system were sandwich-type construction, i.e. the record was formed of a plastic disc coated with a layer of conductive metal which was in turn coated with a dielectric material, such as polystyrene. Subsequently, improved information discs for this system were homogeneous and comprised a thermoplastic matrix having finely divided conductive carbon particles embedded therein.

In order to make such discs sufficiently conductive to obtain capacitive playback, a fairly high loading of carbon black is required. Formulations presently utilized to prepare capacitive information discs contain about 15 percent by weight of a low density, conductive carbon black in a poly(vinyl chloride)-based resin composition. Suitable molding compositions are disclosed in Martin et al. U.S. Pat. No. 4,228,050. Such formulations contain, in addition to the two principal ingredients, a number of additives such as lubricants, stabilizers, processing aids and the like.

The molding compositions described by Martin et al., are comparatively expensive, due principally to the amount of high quality carbon black contained therein. The number of additives present also contributes to the cost of each disc. It would be beneficial to be able to significantly reduce the amount of carbon black and additives present in the disc without losing the conductivity necessary for capacitive playback of high quality video and/or audio signal information.

Another significant expense in the manufacture of capacitive electronic discs is the cost of stampers. The discs are presently produced by compression molding. Considerable flow of the carbon black filled composition takes place in the mold under heat and pressure, and the presence of large numbers of filler particles in the molding composition causes stamper scratching. Because the information pattern embossed into the disc surface is extremely fine, scratching of the surface of metal stampers ends their useful life.

A potential means of reducing the carbon black content of a capacitive electronic disc would be to produce a disc having a less expensive plastic central core disc with conductive regions or layers on one or both surfaces. O'Mara, in U.S. Pat. No. 4,390,487, discloses a method of forming such a layered capacitive electronic disc in which the conductive plastic is injected into a compression mold and a nonconductive core material injected inside the conductive material to form a layered preform which is then compression molded to form a capacitive electronic disc. Discs made by this process contain up to about 70 percent by weight of nonconductive material. While this approach reduces costs by reducing the amount of carbon black required, the discs are still formed from a preform or puck. Therefore, the problem of stamper wear is undiminished.

Ruda, in copending U.S. patent application Ser. No. 522,332, filed Aug. 11, 1983, discloses a layered-type capacitive electronic disc having very thin conductive layers in comparison to those in a disc prepared according to O'Mara. In Ruda, the conductive plastic composition in molten form is made into sheets about 2 to 30 mils thick by passing between rollers in production calendering equipment or in a two-roll mill. Layered discs are formed by compressing a core disc of a conventional nonconductive formulation between two such sheets. This method addresses both of the above problems. However, such a layered disc has the potential for delamination of the conductive surfaces. In addition, there is the added problem that imperfections in the surface of the core disc may "print through" into the information pattern thereby causing distortions in playback.

Dixon et al., in copending U.S. patent application Ser. No. 556,354 filed on Nov. 29, 1983 and Di Marco, in U.S. Pat. No. 4,515,830, disclose processes of forming a layered or sandwich-type capacitive electronic disc utilizing a dispersion of conductive carbon black particles in a solution of a poly(vinylchloride)-based resin. The dispersion is either coated onto a core disc or onto a support surface and dried to form a conductive layer. The layer formed on the support surface is thereafter laminated onto the core disc. The desired information is then embossed into the conductive layer. Although the techniques described by Dixon et al. and Di Marco produce very thin conductive layers, they require the handling of organic solvents with the environmental problems associated therewith.

In accordance with this invention, a method has been found to prepare capacitive electronic discs which is advantageous over previous methodologies.

SUMMARY OF THE INVENTION

In accordance with this invention, capacitive electronic discs ("CEDs") are prepared by direct compression molding of a suitable molding composition in powder form. An information track is embossed therein, preferably simultaneously.

DETAILED DESCRIPTION OF THE INVENTION

In general, the conductive powder composition utilized to prepare the CEDs of this invention can be a complex composition as disclosed by Martin et al. or an improved composition containing substantially fewer ingredients. Suitable simplified conductive compositions are disclosed in the aforementioned Dixon et al. copending application and Datta, U.S. Pat. No. 4,515,916 and Labib et al. copending application Ser. No. 549,560, filed Dec. 16, 1983. In essence, the composition comprises a suitable thermoplastic resin, conductive carbon black particles and additives compatible therewith.

The resin component of the subject CEDs can be a homopolymer or copolymer of vinyl chloride, or a mixture thereof as disclosed by Martin et al., a homopolymer of styrene, or an acrylic monomer, or their copolymers as disclosed by Datta et al. in U.S. Pat. No. 4,416,807, or the like. Poly(vinyl chloride) is presently preferred for the subject discs.

Suitable conductive carbon blacks include low density blacks such as Ketjenblack EC of the Armak Company or CSX-200A of Cabot Corporation. Such carbon blacks have a low bulk density, i.e. about 140–160 grams per liter, an average particle size of about 300 angstroms, a high surface area and a high proportion of voids within the particles as measured by dibutylphthalate absorption.

The CED's of this invention contain from about 70 to 85, preferably from about 75 to 84, percent by weight of the resin; from about 12 to 20, preferably from about 14 to 17, percent by weight of conductive carbon black particles; and up to about 10, preferably from about 1 to 5, percent by weight of additives which are selected from the following groups.

Suitable lubricants include fatty acids such as stearic acid, esters thereof, polyfunctional acid and alcohol esters, soaps including calcium and zinc stearates, fatty acid amides such as stearic acid amide, oleamide and ethylene-bis-stearamide, silanes such as dimethylsiloxane, commercial mixed organic ester preparations such as Loxiol 7109, available from Henkel International Gmbh, and the like. The subject CEDs suitably contain from about 0.5 to about 3 percent by weight of a lubricant, when it is present.

The subject CEDs may contain one or more stabilizers which are suitably organo-metallic compounds derived from metals including tin, lead, zinc, barium and cadmium, such as dibutyltin-$\beta$-mercaptopropriate, dibutyltin maleate and the like. Epoxides, phosphites and alkylated phenols such as t-butylcatechol can also be employed. Generally, these stabilizers are employed in a minor amount, i.e., about 1 to about 4 percent by weight of the total molding composition. The amount of stabilizer present will depend on the particular resin used and the stabilizer itself. A preferred stabilizer is dibutyltin-$\beta$-mercaptopropionate, available from M & T Chemicals, Inc. under the trademark T-35. The stabilizers act primarily to neutralize volatiles formed as decomposition products of the resin at elevated temperatures.

Other additives may include acrylic flow modifiers, solid or liquid platicizers such as diundecylphthalate, a titanate dispersant, i.e. tri(dioctylpyrophosphato)titanate, an organosilicone having polar groups, e.g. 1,3-bis(4-hydroxybutyl)-1,3-didecyldimethyldisiloxane, or a polyalkylene oxide modified dimethyl polysiloxane available from Union Carbide Corporation as UL-722, and the like. Suitably, these additives, when present, are added to the subject CEDs in an amount from about 0.5 percent by weight for an individual compound to about 4 percent by weight for the total of members of the group.

The individual components of the conductive molding composition are comminuted so that they contain substantially no particles larger than about 400 micrometers. Commercial grinding apparatus such as air jet pulverizers is suitable for this purpose. The solid ingredients are comminuted individually or in groups of two or more. The pulverizing procedure may be carried out separate from or ancillary to blending of the solid ingredients. Any large particles, e.g. carbon black agglomerates, that remain after the comminution can be removed by physical separation, e.g. sieving the blend. The liquid ingredients, if any, are suitably added thereto by spraying as an ultra fine mist.

The blended conductive molding composition is preferably thermally processed, i.e. it is heated under high shear to form a melt having the carbon particles uniformly dispersed therein. Thermal processing is preferably carried out by extruding the conductive composition in a Buss Condux Kneading Extruder, or other suitable apparatus. The composition is passed through a die, pelletized and stored. Although a simplified conductive composition, such as disclosed by Dixon et al., may be molded directly after comminution and blending, thermal processing is preferred for the subject invention.

The thermally processed pelletized conductive molding composition is ground to a particle size range such that a substantial portion of the particles, i.e. about 90 percent by weight, are between about 25 and 300 micrometers. The resulting powder is fused into a conductive disc in a standard molding press. Generally from about 15 to 70, preferably about 20, grams of powdered molding composition are added directly to the mold and compressed into a disc. This represents about one-tenth of the amount currently used for conventional CEDs. The powder composition is coated directly onto the stamper surface. It is important that the coating of powder on the stamper be as uniform as possible because of the extreme thinness of the subject CEDs. A homogeneous coating is also necessary to keep any flow which might take place in the mold to a minimum, thus extending the useful life of the stampers.

The subject CEDs are molded at a temperature of from about 170° to 200° C. and a pressure of from about 1500 to 2100 psi. Because the subject CEDs are not molded from a puck, these values are somewhat lower than those presently used to produce commercial CEDs. It is preferred to fuse the powder conductive molding composition into a disc and emboss an information track therein in a single operation. However, compressing of the powdered conductive molding composition into a disc and embossing of an information track therein may be carried out as separate procedures. While an information pattern is suitably embossed into both surfaces of the subject CEDs, a single side may be embossed when desired for specific applications such as certain video games.

The subject CEDs are suitably from 0.15 to 0.6 mm, preferably 0.2 mm, thick. Because the subject CEDs are very thin and also quite flexible, there is a tendency for them to become damaged if they do not readily release from the stampers. One method of eliminating this problem is to place the mold under vacuum when it is opened. Therefore, when the mold is partially opened, there is no rush of air into the mold which would tend to increase retention of the disc against the stamper. Generally, a pressure of below about 10 torr, preferably below about 5 torr, is contemplated.

The surface of the subject CEDs is suitably lubricated with, e.g. a fractionated methylalkyl siloxane such as disclosed in U.S. Pat. No. 4,275,101, issued June 23, 1981, preferably doped with an additive such as disclosed in U.S. Pat. No. 4,330,583, issued May 18, 1982, or U.S. Pat. No. 4,355,062, issued Oct. 19, 1982. This composition is suitably applied to the disc as a fine mist.

In addition to the aforementioned savings in material costs and stamper wear provided by the CEDs of this invention over conventional CEDs, the subject CEDs were found to be somewhat more conductive than conventional CEDs. Although the explanation for this is not known with certainty, it is believed to result from the fact that there is no appreciable flow of material during the molding step.

The following example further illustrates this invention, it being understood that the invention is in no way intended to be limited to the details described therein. In the example, all parts and percentages are on a weight basis and all temperatures are in degrees Celsius, unless otherwise stated.

EXAMPLE 14.75 Parts of conductive carbon black, CSX200A of the Cabot Corporation, comminuted to reduce the particle size of the agglomerates to less than 25 micrometers, were combined with 78 parts of Geon 110×346, poly(vinyl chloride) resin of the B. F. Goodrich Co.; 0.75 part of Loxiol 1709; 2.5 parts of T-35; and 1.0 part of Acryloid K-175, an acrylic processing aid and high temperature lubricant available from Rohm & Haas Company, similarly ground, and mixed until throughly blended. The following liquid ingredients were added to the blended solid ingredients as a fine spray: 1.0 part of dibutyltin maleate stabilizer, Mark 275 of Argus Chemical Company; and 2.0 parts of diundecyl phthalate (DUP) plasticizer. Mixing was continued until the temperature of the mixture reached 235° F. (113°). The mixture was cooled to ambient, fed to a Buss Condux Kneading Extruder and melt-extruded in the form of a pelletized molding composition. The pelletized conductive molding composition was comminuted in a commercial pulverizer to form a powder having no particles larger than about 400 micrometers and a substantial proportion, i.e. about 90 percent by weight, between about 25 and 300 micrometers.

The powdered conductive molding composition was uniformly coated onto a conventional CED stamper in a compression molding apparatus to a thickness of about 0.3 mm. A total of 20 g of conductive molding composition was coated onto the stamper. The powder was molded at 190° and 1470 psi to fuse it into a flexible conductive disc 0.2 mm thick and simultaneously emboss an information track therein. The disc produced a commercially acceptable picture on playback.

We claim:

1. A method of forming a conductive, high density information disc suitable for capacitive readout which comprises:
    (a) providing in a suitable molding apparatus a homogeneous powder composition and having a particle size of 400 micrometers or less and comprising a homopolymer or copolymer of vinyl chloride, sufficient conductive carbon black to provide capacitive readout, stabilizers, processing aids and lubricants compatible therewith;
    (b) directly compressing the powder composition in said apparatus under heat and pressure to form a conductive disc having a thickness of from about 0.15 to 0.6 mm; and
    (c) embossing an information track in at least one surface thereof.
2. A method in accordance with claim 1, wherein steps (b) and (c) are carried out simultaneously.
3. A method in accordance with claim 1, wherein the particle size of about 90 percent by weight of the powder composition is between about 25 and 300 micrometers.
4. A method in accordance with claim 1, wherein the disc has a thickness of about 0.2 mm.
5. A method in accordance with claim 1, wherein said composition is thermally processed by heating under high shear to form a melt having the carbon particles uniformly dispersed therein prior to being comminuted to form said homogeneous powder.
6. A method in accordance with claim 5, wherein said composition is thermally processed by passing through an extruder.
7. A method in accordance with claim 1, wherein an information track is embossed in both sides of the disc.
8. A method in accordance with claim 1, wherein the disc is removed from the molding apparatus under reduced pressure.
9. A method in accordance with claim 8 wherein the disc is removed from the molding apparatus under a pressure below about 10 torr.
10. A method in accordance with claim 1, wherein the composition contains a homopolymer of vinyl chloride.

* * * * *